March 29, 1932.  J. E. ELLOR  1,851,500
AIR INTAKE FOR ENGINES
Filed Sept. 10, 1929  2 Sheets-Sheet 1
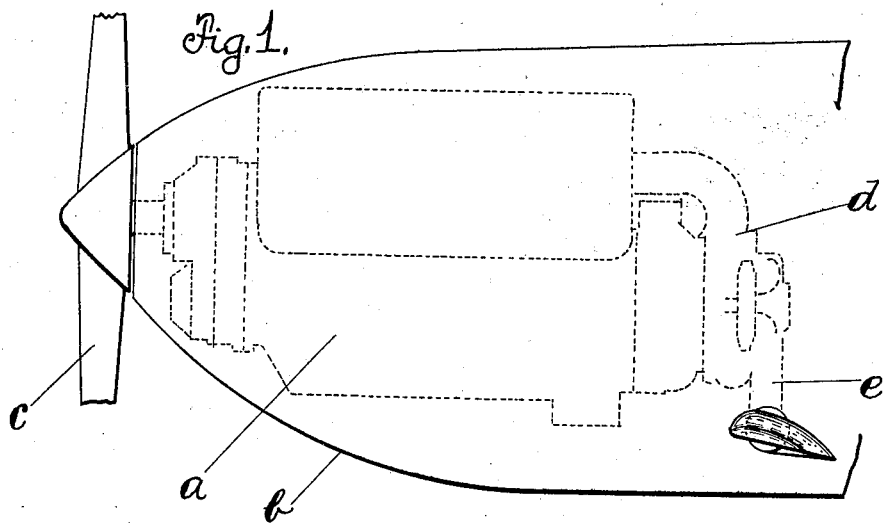
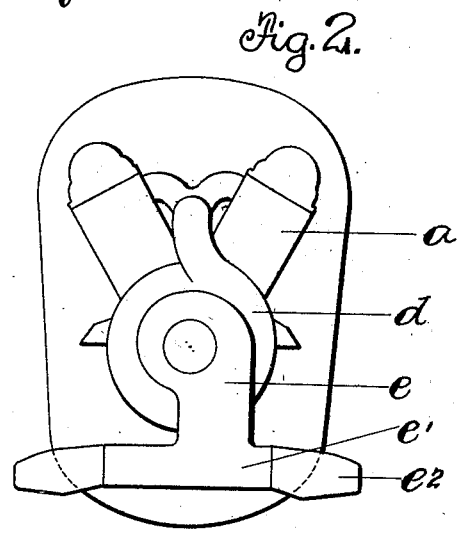
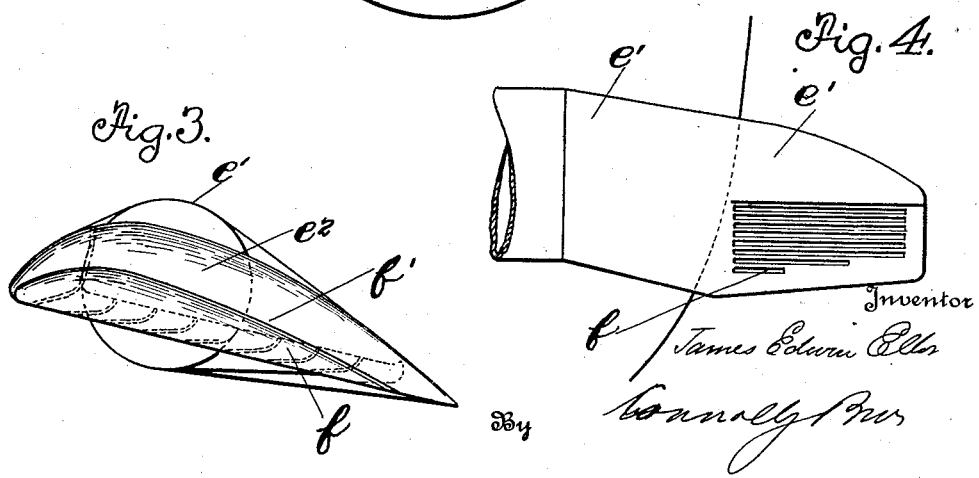

March 29, 1932. J. E. ELLOR 1,851,500
AIR INTAKE FOR ENGINES
Filed Sept. 10, 1929 2 Sheets-Sheet 2
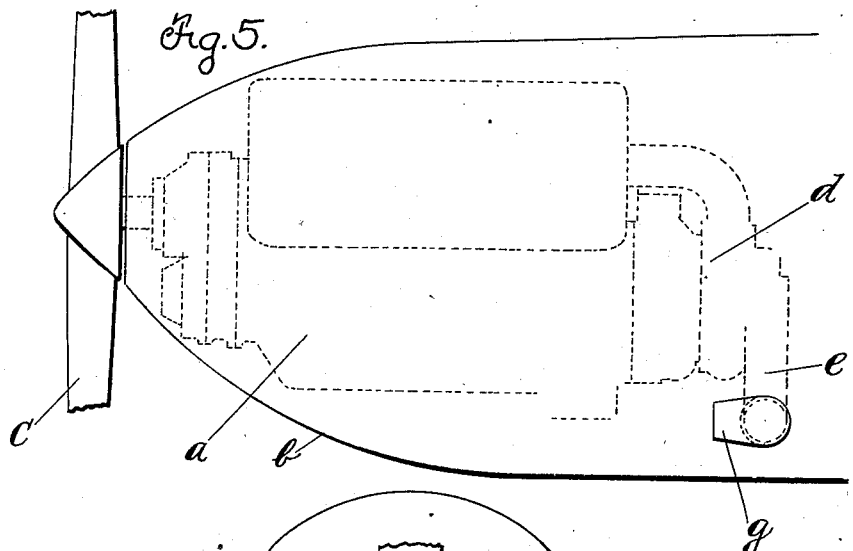
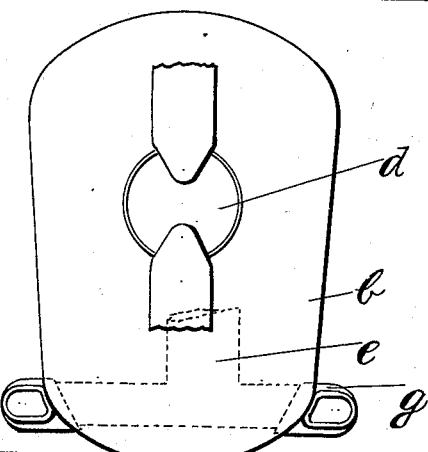
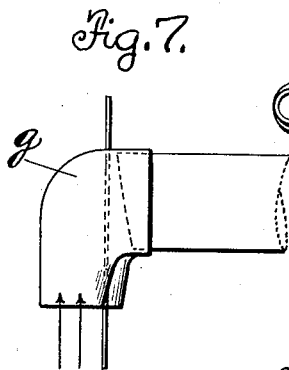
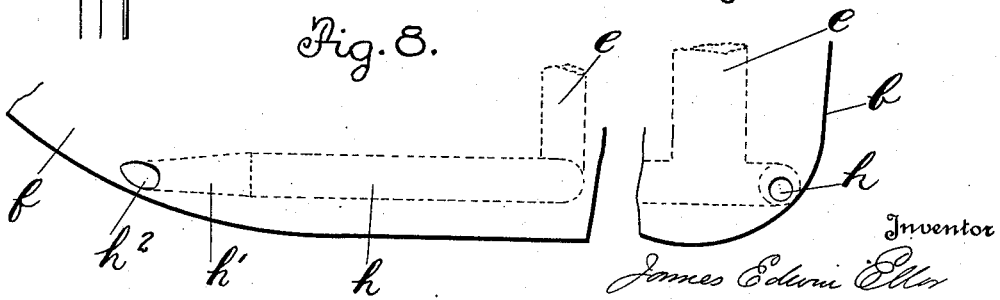

Patented Mar. 29, 1932

1,851,500

UNITED STATES PATENT OFFICE

JAMES EDWIN ELLOR, OF DERBY, ENGLAND, ASSIGNOR TO ROLLS-ROYCE LIMITED, OF DERBY, ENGLAND

AIR INTAKE FOR ENGINES

Application filed September 10, 1929, Serial No. 391,547, and in Great Britain September 13, 1928.

This invention has reference to internal combustion engines or other engines for which a supply of air is required. It is mainly applicable to engines for high speed locomotive machines, such as aeroplanes, and has for its object improved means of supplying the required air to the engine, whether for fuel purposes, cooling purposes or for any other purposes in respect of which admitted air is required to be above external atmospheric pressure. Difficulties have been experienced in connection with the shape of the air intake in engines for high speed locomotive machines, it being found that in some forms of intake the eddies caused by the great speed of the stream of air under certain conditions inhibit or disturb the passage of air through the opening and the main pipe leading to the engine.

According to this invention the kinetic energy of the air stream is utilized by forming the inlet of the intake as the second stage of a Venturi tube and consists in a forwardly projecting tube or member, provided with a passage way or passage ways, each of which presents to the air stream a comparatively restricted orifice, and as it recedes from such orifice expands in cross section area, and at its inward end merges or opens into a pipe or passage way leading to the engine.

In order to avoid so far as possible the air resistance commonly called "skin friction" which would be produced by such a tube or member, I by preference construct the forwardly projecting tube or member in "aerofoil" form, that is to say, so shaped as to offer a minimum resistance to movement through the air, and to bring about a negative pressure or vacuum above, and a positive pressure below; and in the tube or member so formed I construct by preference a number of passage ways, rectangular and tapering in cross section, each such way having its smaller end open to the atmosphere on the under side of the tube or member and its larger end merging or opening into the tube or passage way leading to the engine.

Preferably the cross section area of the orifice or orifices presented to the atmosphere is so related to the cross section area of the main pipe or passage way leading to the carburettor, that the velocity of air entering such orifice or orifices is approximately that of the air stream.

Preferably the engine should be provided with two such intakes, one on each side.

The effect of the arrangement is that the pressure where the air is being delivered to the engine is substantially increased according to the well known principle of the Venturi tube.

The invention is particularly useful in connection with engines provided with a supercharger, no matter which of the known types of super-chargers is adopted.

Three examples of this invention are shown in the accompanying drawings.

Figure 1 is a side elevation of an aeroplane engine cowling.

Figure 2 is a rear elevation of Figure 1.

Figures 3 and 4 are enlarged side and front elevations of one of the air intakes illustrated in Figures 1 and 2.

Figure 5 is a side elevation and Figure 6 is a front elevation of an engine and its cowling having another form of air intake made in accordance with this invention.

Figure 7 is an enlarged section plan view of one of the air intakes according to the form of the invention illustrated in Figures 5 and 6.

Figures 8 and 9 are respectively side elevations and forward end elevations of part of the engine cowling and air intake of a form slightly differing to that illustrated in Figures 5 to 7.

$a$ is an aeroplane engine contained in a cowling $b$ part of the propeller being shown at $c$. $d$ is the super charging blower. $e$ is the main air intake pipe which is divided into two branches $e^1$ which at the point of their emergence from the cowling $b$ are formed in projections of aerofoil shape $e^2$ as is illustrated in Figures 3 and 4. The said projections are formed with an opening on the under side and across such opening are fixed a number of horizontal slats or strips $f$ parallel to each other, and of forwardly curving shape. Owing to the shape of the "aero-foil" shape of each of the projections there is formed a pressure of air underneath it (which further aids the Venturi tube constrictor in causing air pressure in the intake pipe) and such air will pass into the narrow opening left between the slats and so into the main air intake pipe.

Another form of this invention is illustrated in Figures 5, 6 and 7 where in lieu of forming the ends of the pipe in aerofoil section, on th ends thereof are fitted bent pieces $g$ which in manner shown project forward close to the cowling of the engine in such manner that the air sweeping along such cowling is deflected into the said intakes with the minimum amount of disturbance. In Figures 8 and 9 the ends of the said air intake in lieu of being carried straight through the cowling are bent forward and carried for some considerable way inside such cowling as shown at $h$ and are tapered as shown at $h^1$ and eventually emerge as plain flush cicular holes $h^2$.

What I claim is:—

1. In an internal combustion engine an air-intake member having a main air intake passage way, a plurality of subsidiary air passage ways each at one end connected to the main passage way and at the other having an orifice presented to the air, the subsidiary passage ways diminishing in cross section area as they recede from the main passage way and the aggregate cross section areas of their orifices being less than the cross section area of the main passage way.

2. In an internal combustion engine an air intake member having a part in aerofoil shape, the air intake passage being of variable cross section area and having an orifice presented to the air on the underside of the said part and the cross section area of the orifice being smaller than that of any other part of the passage way.

3. In an internal combustion engine an air intake member a part of which is of aerofoil shape having its air intake passage way of variable cross section area and having a plurality of orifices presented to the air on the underside of the said part the aggregate cross section areas of such orifices being less than the cross section area of any part of the main passage way.

4. In an internal combustion engine an air intake member a part of which is of aerofoil shape having a passage way of variable cross section area, with a plurality of orifices presented to the air on the underside of the said part, such orifices being in the form of approximately parallel rectangular openings approximately normal to the external air stream.

5. In an internal combustion engine an air intake member as claimed in claim No. 4 the said part having an enlarged opening on the underside, with overlapping slats fixed across such opening in parallel relation, and the slats being curved upwards to form a tapering orifice between each two of them.

6. In an internal combustion engine an air intake member having an air intake passage way of variable cross section, an orifice presented to the air being of smaller cross section area than that of any other part of the passage way, and being so related in cross section area to the pipe conducting air to the carburetter that the velocity of the air entering the orifice is approximately the same as that of the external air stream.

7. In an internal combustion engine an air intake member having an air intake passage of variable cross section, and having a plurality of orifices presented to the air, the aggregate cross section area of such orifices being smaller than that of any other part of the passage way, and being so related in cross section area to the pipe conducting air to the carburetter that the velocity of the air entering the orifices is approximately the same as that of the external air stream.

8. In an internal combustion engine the combination of an air intake member having an air intake passage of variable cross section area and with an orifice presented to the air, the cross section of which is smaller than that of the other parts of the passageway and a supercharging blower, the intake passage way of the intake member being connected to the receiving end of the blower, and the exit from the blower, to the inlet of the carburetter.

In testimony whereof I have hereto affixed my signature.

JAMES EDWIN ELLOR.